(No Model.)
M. D. PHELAN.
ROTARY CUTTER FOR TRIMMING MACHINES.
No. 400,788. Patented Apr. 2, 1889.
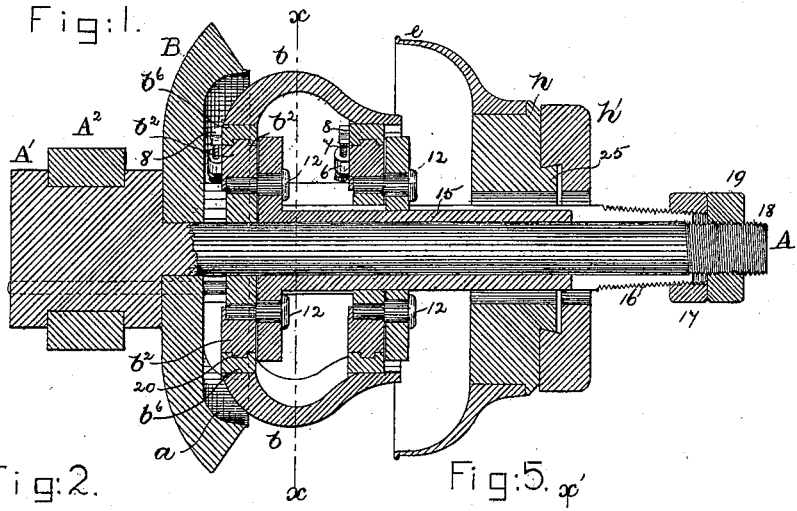
Fig. 1.
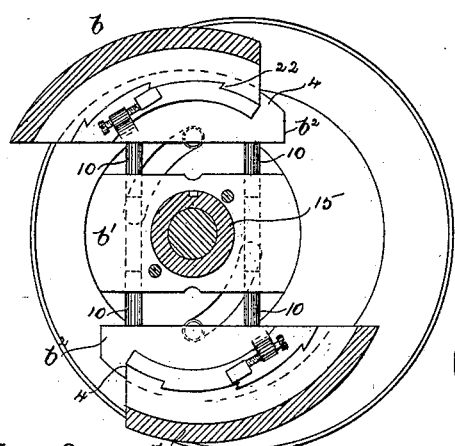
Fig. 2.
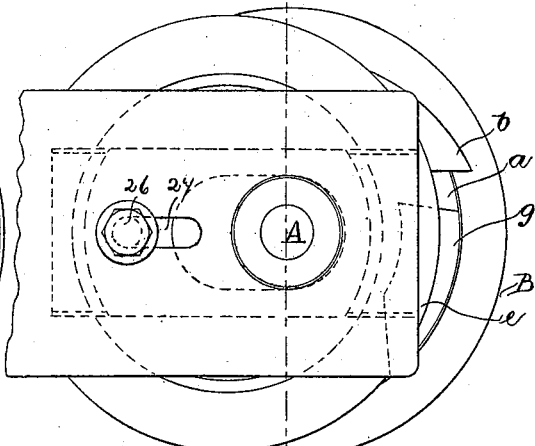
Fig. 5.
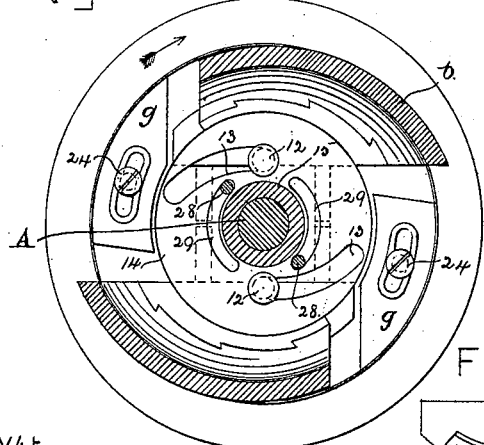
Fig. 3.
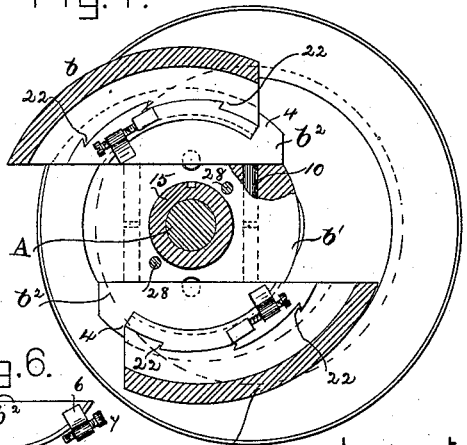
Fig. 4.
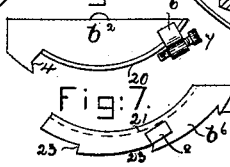
Fig. 6.
Fig. 7.
Witnesses:
Fred. L. Greenleaf
Frederick L. Emery
Inventor.
Merton D. Phelan
by Crosby & Gregory
Attys.

UNITED STATES PATENT OFFICE.

MERTON D. PHELAN, OF WOLLASTON, ASSIGNOR TO JAMES W. BROOKS, TRUSTEE, OF CAMBRIDGE, MASSACHUSETTS.

ROTARY CUTTER FOR TRIMMING-MACHINES.

SPECIFICATION forming part of Letters Patent No. 400,788, dated April 2, 1889.

Application filed June 13, 1888. Serial No. 276,959. (No model.)

*To all whom it may concern:*

Be it known that I, MERTON D. PHELAN, of Wollaston, in the county of Norfolk and State of Massachusetts, have invented an Improvement in Rotary Cutters for Heel-Trimming Machines, of which the following description, in connection with the accompanying drawings, is a specification, like letters on the drawings representing like parts.

This invention has for its object to improve heel-trimming tools, that both ends of the molded blades may be covered or uncovered at will, according to the curvature or shape of the heel at its back, the cutter herein described being adapted to trim heels of different shape, the shape depending upon which portions of the blades of the cutter are left exposed to meet and trim the heel.

My invention consists, essentially, in the combination, with a rotary molded cutter and a counter or rand guard, of a tread-guard recessed to receive in it the large ends of the blades of the cutter and means for adjusting the cutter with relation to both the counter and tread guard and to increase or decrease the diameter of the cutter, whereby the edges of the blades may be kept in proper relation to the said guards under all adjustments of the parts. I have shown, as I prefer, the counter-guard as adjustable for high and low heels, as is well understood.

Other features of my invention will be hereinafter described, and specified in the claims at the end of this specification.

Figure 1 is a longitudinal horizontal section of a sufficient portion of a rotary cutter embodying my improvements to enable my invention to be understood; Fig. 2, a section of Fig. 1 in the line $x$, looking to the right, the rotary cutter being shown as fully expanded. Fig. 3 is a like section looking to the left. Fig. 4 is a section the same as Fig. 2, but with the rotary cutter fully contracted. Fig. 5 is a right-hand end view of Fig. 1, the dotted line $x'$ showing the line of section for Fig. 1. Fig. 6 shows one of the blade-carrying portions detached, and Fig. 7 one of the blade-holders detached.

A may be supposed to represent the rotary shaft of any usual heel-trimming machine; A', a hub on the said shaft, and $A^2$ one of the bearings for the shaft.

The tread-guard B, fixed to the end of the hub by suitable screws, (not shown,) is cut out or recessed at its front or outer side next the rotary molded cutter, as best shown in Fig. 1, to leave a chamber, $a$, into which enter the inner ends of the blades $b$ of the rotary molded cutter, the head of which, as herein shown, is composed of a central portion, $b'$, (see Fig. 2,) and movable sections $b^2$, grooved at their peripheries, as shown in Fig. 1, to leave a dovetailed projection, 20, extended in the arc of a circle from a shoulder, 4, the said dovetailed projections receiving upon them the blade-carrying blocks $b^6$, in turn grooved at their inner sides, as at 21, (see dotted lines, Fig. 7,) to fit and slide on the said dovetailed projections 20 toward and from the said shoulder.

As herein shown, the inner side of each blade (see Figs. 2 and 4) is notched to leave projections 22, adapted to be engaged by corresponding notches or projections, 23, of the blade-carrying blocks $b^6$.

Each movable section $b^2$ has, as shown, an ear, 6, which receives a screw, 7, the end of which is made to abut against a lug, 8, projecting from the block $b^6$, the rotation of the said screw enabling the blade to be clamped firmly in place between the shoulder 4 and the blade-carrying block. The movable sections $b^2$, when in contact with the central portion, $b'$, as shown in Fig. 4, forms with the said central portion a substantially-annular disk, and in such condition the inner ends of the blades $b$ may be made to enter the chamber $a$ in such manner as to insure the tread-guard covering a very considerable portion of the outer ends of the blades, the said movable sections each, as herein shown, having two like guide-rods, 10, which enter holes in the central portion, $b'$.

Each movable section has a laterally-extended pin or stud, as 12, which is extended outwardly through an eccentric slot, as 13, in a disk, 14, there being two such disks, each splined on or connected to a sleeve, 15, surrounding the cutter-shaft A, the said sleeve being rotatable on the said shaft to turn the disks 14 and cause their slots, acting on the pins or studs 12, to move the sections $b^2$ outwardly from the center of the shaft A, and at the same time carry with them the blades $b$ until the blades come out close to the overhanging flanged portion of the tread-guard.

The outer end of the sleeve 15 is tapered and split longitudinally in two or more places, as shown in Fig. 1, and threaded, as at 16, to receive a clamping-nut, 17, which is screwed thereon, the said nut acting to clamp the sleeve in the shaft A. The outer end of the shaft A is also screw-threaded, as at 18, to receive a check-nut, 19, which serves as a stop or check for the nut 17, the adjustment of the nut 19 on the shaft A enabling the sleeve to be moved longitudinally on the shaft A, so as to keep the inner ends or portions of the blades, in all adjustment of the cutters, close to the inner wall of the tread-guard—as, for instance, when the cutter is contracted, as in Fig. 4, or is of least diameter—for then the blades enter farther into the chamber $a$, and the nut 19 is screwed farther upon the shaft A; but when the effective diameter of the cutter is to be changed the nuts 19 and 17 will be loosened, and the sleeve 15, cutter-head, and cutters will be moved longitudinally on the shaft A away from the tread-guard, and thereafter the sleeve will be rotated to move the sections $b^2$ outwardly, as described, the movement being sufficient to again place the blades close to the overhanging inner wall of the tread-guard, when the nuts referred to will be again turned to secure the parts in adjustable position.

Should it be attempted to use the cutter when the sleeve was adjusted longitudinally, as described, and before turning the sleeve to expand the cutter, then such attempt would prove a failure, for there would be more or less space between the blades at the inner end of the cutter and the tread-guard, and the cutter could not trim the heel to the tread-guard.

The tread-guard, it being herein shown as rotating in unison with the shaft A, has attached to it, (see Fig. 3,) by screws 24 in the chamber $a$, two auxiliary cutters, $g$ $g$, which in practice remove any fin which may be left at the corner of the "tread." The rand or counter guard $e$ is herein shown as a saucer-like or dished plate having a lip to run in the rand-crease in usual manner. To enable this rand or counter guard to be adjusted to adapt it to each different position of the cutter and tread guard, I have mounted the rand-guard on a carrier, $h$, having, as herein shown, a dovetailed projection, 25, which enters a dovetailed slot in a guide or track, $h'$, secured to any rigid part of the frame-work of the trimming-machine in which the shaft A is mounted, the said carrier being held in adjustable position by a screw, 26, extended through a slot, 27, in the said guide or track.

In practice the heel to be trimmed will be held against the tread-guard and counter-guard at the right-hand side of the cutter, viewing Fig. 5, which figure shows the acting side of the cutter, or that side of the cutter, where the trimming is done, both the tread-guard and the rand or counter guard at such acting side coming close to the acting edges of the blades and covering more or less the opposite ends of the said blades, according to which portion of the blades are to be effective in trimming the heel, the portions of the blades left uncovered and exposed to attack the heel being according to the particular shape desired for the heel—that is, the greater the portions of the blades exposed next the tread-guard the greater the concavity in the heel, and vice versa.

I do not desire to limit my invention to the exact manner shown for confining the blades of the cutter, nor to their exact shape, nor to the particular devices employed for adjusting or expanding the cutter; nor do I desire to limit my invention to the means shown for supporting and adjusting the tread-guard or the rand or counter guard.

I do not claim, broadly, a laterally or a longitudinally adjustable rand or counter guard, nor do I broadly claim a recessed longitudinally-adjustable tread-guard; but prior to my invention I am not aware that any one has ever employed a cutter or an expansible cutter, together with an adjustable tread-guard and an adjustable rand or counter guard, the said parts being relatively adjustable, as described, to expose different portions of the edge of the blades, according to the style of the heel, thus enabling one and the same cutter to trim heels differing materially in shape.

The central portions, $b'$, of the head of the rotating cutter are connected together, as herein shown, by long guide-pins 28, which extend from the hub into both the said portions $b'$, so that they rotate with the shaft A, the said pins 28 passing through slots 29 in the disks 14.

I claim—

1. In a heel-trimming tool, a chambered tread-guard and expansible cutter, combined with a rand or counter guard, the said parts being adjustable relatively toward and from each other in the direction of the length of the cutter-shaft to expose different portions of the blades of the cutter, according to the style of the heel, substantially as described.

2. The combination, with a cup-shaped counter-guard and a chambered tread-guard, of a cutter-shaft and an expansible cutter connected thereto between the said counter-guard and tread-guard and made adjustable with relation to the said counter and tread guards in the direction of the length of the cutter-shaft, to operate substantially as described.

3. The chambered or dished tread-guard, cutter-shaft, and cutter thereon made adjustable longitudinally in the direction of the length of the said shaft within the chambered end of the tread-guard, combined with means, substantially as described, to expand the cutter and to enable its blades to substantially fill the chambered portion of the tread-guard inclosing the said blades, substantially as described.

In testimony whereof I have signed my name to this specification in the presence of two subscribing witnesses.

MERTON D. PHELAN.

Witnesses:
   JOHN F. REA,
   L. G. PHILBROOK.